United States Patent
Brown et al.

(10) Patent No.: US 10,217,135 B2
(45) Date of Patent: Feb. 26, 2019

(54) PRESENTING AN ADVERTISEMENT IN A VEHICLE

(71) Applicant: Pacific Wave Technology Inc., Henderson, NV (US)

(72) Inventors: Wendell Brown, Henderson, NV (US); Evan Tann, Manitou Beach, MI (US)

(73) Assignee: Pacific Wave Technology, Inc., Henderson, NV (US)

( * ) Notice: Subject to any disclaimer, the term of this patent is extended or adjusted under 35 U.S.C. 154(b) by 587 days.

(21) Appl. No.: 14/614,385

(22) Filed: Feb. 4, 2015

(65) Prior Publication Data
US 2015/0220992 A1   Aug. 6, 2015

Related U.S. Application Data

(60) Provisional application No. 61/936,083, filed on Feb. 5, 2014.

(51) Int. Cl.
G06Q 30/00       (2012.01)
G06Q 30/02       (2012.01)

(52) U.S. Cl.
CPC ..... *G06Q 30/0261* (2013.01); *G06Q 30/0265* (2013.01)

(58) Field of Classification Search
CPC ................ G06Q 30/0251; G06Q 30/0241
USPC ............................................ 705/14
See application file for complete search history.

(56) References Cited

U.S. PATENT DOCUMENTS

| | | | |
|---|---|---|---|
| 2002/0007306 A1* | 1/2002 | Granger | G06Q 30/0255 705/14.55 |
| 2006/0064411 A1 | 3/2006 | Gross et al. | |
| 2007/0016362 A1* | 1/2007 | Nelson | G01C 21/362 701/425 |
| 2007/0050249 A1* | 3/2007 | Huang | G06Q 30/00 705/14.26 |
| 2008/0139181 A1* | 6/2008 | Lokshin | G06Q 30/02 455/414.1 |
| 2008/0319653 A1 | 12/2008 | Moshfeghi | |
| 2009/0006194 A1* | 1/2009 | Sridharan | G06Q 30/02 705/14.62 |
| 2010/0280905 A1* | 11/2010 | Rothschild | G06Q 30/02 705/14.63 |
| 2010/0312607 A1 | 12/2010 | Kidd | |

(Continued)

FOREIGN PATENT DOCUMENTS

WO    WO 2015/120166    8/2015

OTHER PUBLICATIONS

Ford Sync Meets Best Buy Mobile as Ford and Best Buy Team Up to Help Customers Get Connected, PR Newswire (Year: 2009).*

(Continued)

*Primary Examiner* — Matthew L Hamilton
(74) *Attorney, Agent, or Firm* — Alston & Bird LLP

(57) ABSTRACT

A technique for providing advertisement information is disclosed. The technique includes, in part sending, from a device built into a vehicle, a first set of data to a server, the first set of data corresponding to measurements performed by one or more sensors, receiving a first set of elements from the server in response to the first set of data, presenting one or more elements from the first set of elements to a user of the vehicle on a display in the vehicle, and receiving at least one input corresponding to at least one selected element among the one or more elements.

16 Claims, 7 Drawing Sheets

(56) References Cited

U.S. PATENT DOCUMENTS

| | | | | |
|---|---|---|---|---|
| 2011/0018759 A1* | 1/2011 | Bennett | G01C 21/3688 | 342/357.4 |
| 2011/0117900 A1* | 5/2011 | Reunamaki | H04M 3/42382 | 455/418 |
| 2011/0119257 A1 | 5/2011 | Rajasekhar | | |
| 2011/0270685 A1* | 11/2011 | Marks | G06Q 30/02 | 705/14.66 |
| 2012/0271713 A1* | 10/2012 | Nussel | G06Q 30/0241 | 705/14.53 |
| 2012/0310713 A1* | 12/2012 | Mercuri | G06Q 30/0207 | 705/14.1 |
| 2013/0311898 A1* | 11/2013 | Beaurepaire | G01C 21/3438 | 715/744 |
| 2014/0087760 A1* | 3/2014 | Bennett | H04W 4/046 | 455/456.3 |
| 2014/0107891 A1* | 4/2014 | Choi | H04M 1/6083 | 701/36 |
| 2014/0128144 A1* | 5/2014 | Bavitz | A63F 9/24 | 463/23 |
| 2014/0136187 A1* | 5/2014 | Wolverton | G06F 17/30654 | 704/9 |
| 2014/0163774 A1* | 6/2014 | Demeniuk | G08C 17/02 | 701/2 |
| 2014/0201004 A1* | 7/2014 | Parundekar | G06Q 30/0265 | 705/14.62 |
| 2014/0257989 A1* | 9/2014 | Prakah-Asante | G01C 21/3484 | 705/14.63 |
| 2014/0279021 A1* | 9/2014 | MacNeille | G06Q 30/0266 | 705/14.63 |
| 2014/0304750 A1* | 10/2014 | Lennnney | H04N 21/41422 | 725/75 |
| 2014/0365126 A1* | 12/2014 | Vulcano | G01C 21/36 | 701/533 |
| 2015/0046022 A1* | 2/2015 | Bai | G07C 5/008 | 701/31.5 |
| 2015/0112800 A1* | 4/2015 | Binion | G06Q 30/0255 | 705/14.53 |
| 2016/0066013 A1* | 3/2016 | Li | H04N 21/2541 | 725/75 |
| 2016/0100018 A1* | 4/2016 | MacKenzie | H04W 4/025 | 709/224 |

OTHER PUBLICATIONS

PCT International Search Report and Written Opinion of the International Searching Authority for application PCT/US2015/014646 dated May 1, 2015.

PCT International Preliminary Report on Patentability for application PCT/US2015/014646 dated Aug. 9, 2016.

EP Supplementary European Search Report for application EP15746861 dated Aug. 21, 2017.

* cited by examiner

PRESENTING AN ADVERTISEMENT IN A VEHICLE

CROSS-REFERENCE TO RELATED APPLICATIONS

This Application claims benefit under 35 USC 119 (e) of U.S. Provisional Application No. 61/936,083, entitled "Responding to an Advertisement on an in-dash vehicle display," filed Feb. 5, 2014, the content of which is incorporated herein by reference in its entirety.

TECHNICAL FIELD

The present invention generally relates to presenting relevant information to a user, and more particularly to a method for generating a real-time stream of information associated with inputs from a computing device and presenting the information via an electronic device disposed in a vehicle.

BACKGROUND

An advertisement, hereinafter also referred to as an "ad," is used to market and sell a product or service. Typical advertisements contain primary information in the form of text, images and/or audio information about a product or service. The primary information in the advertisement may also contain information, such as a toll-free 800 number, a website address, a physical street address, or another means of action, that provides a way for the viewer or listener to take an action to either buy the product or obtain more supplemental information related to the product. Magazine and video ads, roadside billboards, street-level ads, posters in the subway or bus stops, digital-out-of-home advertisements, kiosks, advertisements on vehicles such as taxis, buses, cars, and the like, contain similar information.

BRIEF DESCRIPTION OF THE DRAWINGS

An understanding of the nature and advantages of various embodiments may be realized by reference to the following figures. In the appended figures, similar components or features may have the same reference label.

SUMMARY

Figure 1:
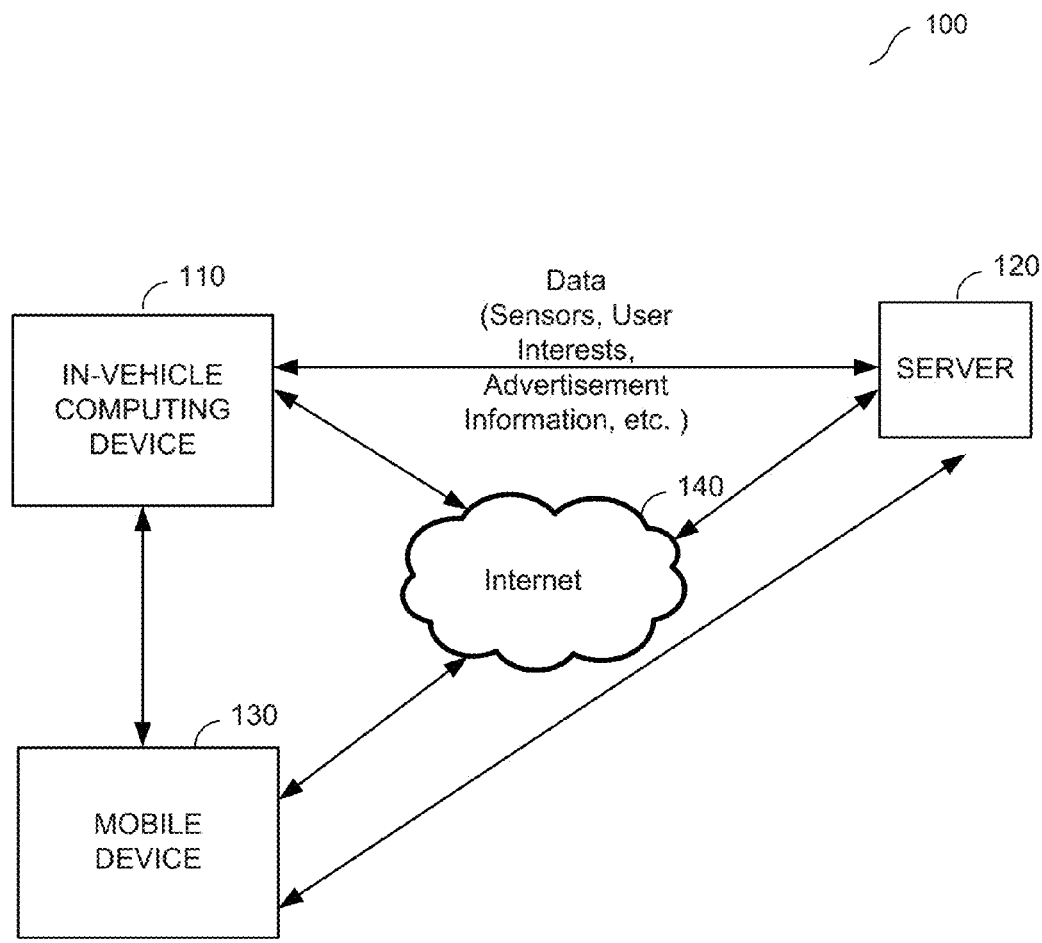
FIG. 1 shows an exemplary communication system including a device disposed or built-in a vehicle, a mobile device, and a server, according to one embodiment of the present invention.

In one embodiment, a method for providing information to a user of a vehicle is disclosed. The method includes, in part, sending, from a device built into the vehicle, a first set of data to a server, the first set of data corresponding to measurements performed by one or more sensors, receiving a first set of elements from the server in response to the first set of data, presenting one or more elements from the first set of elements to the user on a display in the vehicle, and receiving from the user a selection from among the one or more elements. In one embodiment, the method further includes, in part, sending a second set of data of interest to the user to the server.

In one embodiment, the at least one input corresponds to at least one further action to be taken by the device. In one embodiment, the at least one action includes requesting additional information corresponding to the selected element. In one embodiment, the at least one action includes requesting navigational information to a venue corresponding to the advertiser. In one embodiment, the at least one action includes a request to enter into a transaction or a potential transaction associated with the selected element.

In one embodiment, presenting one or more elements from the first set of elements includes, in part, sending the one or more elements to a second device associated with the user to be presented on a screen of the second device. In one embodiment, the at least one input is received from an input device built into the vehicle. In one embodiment, the at least one input is received from a second device associated with the user. In one embodiment, the display is built into the vehicle or part of a device being transported in the vehicle. In one embodiment, the method further includes, in part, synchronizing a first display built into the vehicle with a second display of a second device, said second device being associated with the user.

In one embodiment, presenting one or more elements from the first set of elements includes presenting an audio corresponding to the one or more elements. In one embodiment, at least one of the one or more sensors is disposed in the vehicle. In one embodiment, at least one of the one or more sensors is disposed in a second device associated with the user.

In one embodiment, a method for selecting advertisement is disclosed. The method includes, in part, receiving a first set of data corresponding to measurements performed by one or more sensors, selecting one or more output elements from a second set of data in accordance with the first set of data, the second set of data corresponding to one or more advertisements, and sending the one or more output elements to a device built-in a vehicle to be presented to a user of the vehicle.

In one embodiment, the first set of data is received from the device built-in the vehicle. In one embodiment, the first set of output elements is selected based further on a set of data of interest to the user. In one embodiment, selecting one or more output elements from a second set of data includes, in part, ranking the second set of data based on their relevance with the first set of data to generate a ranked set of data, and selecting one or more of highest ranked elements from the ranked set of data as the one or more output elements.

In one embodiment, an apparatus built into a vehicle for providing information to a user is disclosed. The apparatus includes, in part, a transmitter for sending a first set of data to a server, the first set of data corresponding to measurements performed by one or more sensors, a receiver for receiving a first set of elements from the server in response to the first set of data, a display for presenting one or more elements from the first set of elements to the user, and an input device for receiving from the user a selection from among the one or more elements.

In one embodiment, a non-transitory processor-readable medium for providing information to a user of a vehicle is disclosed. The non-transitory processor-readable medium includes, in part, processor-readable instructions configured to cause a processor to send, from a device built into the vehicle, a first set of data to a server, the first set of data corresponding to measurements performed by one or more sensors, receive a first set of elements from the server in response to the first set of data, present one or more elements from the first set of elements to the user on a display in the vehicle, and receive from the user a selection from among the one or more elements.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims. The word "exemplary" is used herein to mean "serving as an example, instance, or illustration." Any embodiment or design described herein as "exemplary" is not necessarily to be construed as preferred or advantageous over other embodiments or designs.

As used herein, the term "vehicle" or automotive vehicle refers to a device that is used for transporting people and/or goods, such as a car, a sport-utility-vehicle (SUV), a truck, a bus, a boat, a vessel or any other moving apparatus.

As used herein, the term "mobile device" refers to any portable computing and/or communication device that is portable and can be moved from one place to another. For example, a mobile device may be a cellular telephone, cell-phone, smartphone, tablet, wireless communication device, laptop computer, mini-laptop, pad, mini-tablet, mini-pad, personal digital assistant (PDA), personal audio device (PAD), head-mount display (HMD), GPS device, and/or other movable devices. A mobile device may further refer to a wearable computing device. The wearable computing device may include a processor and a memory, and can be worn on the body. Wearable computing devices may in general have any form, such as an eyeglass, an earpiece, a wristband, a wrist-device, a medallion, a device worn around the neck, an arm band, an arm-device, a device worn on the head such as a hat, a piece of clothing such as a shirt, a pair of pants, a scarf, and the like, a piece of outer clothing such as a coat, jacket, or the like.

In recent years, vehicles have become more and more sophisticated. Many of today's vehicles may include one or more built-in computing devices. These built-in computing devices usually control different functionalities of the vehicle. Computing devices built into the vehicles and/or mobile devices may contain a variety of sensors and data-input devices or rely on or use inputs from a variety of sensors or data-input devices. Typical information, hereinafter also referred to as "data," from these devices may include global positioning system (GPS) location information, wireless network status, mobile cell phone tower location, device acceleration, audio inputs, video inputs, vehicle status, fingerprint sensors, ambient light inputs, information about other devices associated or nearby the user's mobile device, e.g., tethered Bluetooth® devices, and/or the like.

A user of such vehicles and/or mobile devices may also be associated with various online social accounts or networks, such as Facebook, Twitter, LinkedIn and other similar accounts and/or networks. Online social account information may include a user's likes and dislikes, which may represent the user's interests.

Embodiments of the present invention disclose a computer-implemented method for providing advertisement information to a user. In one embodiment, advertisement information may be ranked and/or selected based on data measured by one or more environmental sensors. In one embodiment, the one or more environmental sensors may be associated with a vehicle, or a mobile device that is transported by the vehicle. In one embodiment, the advertisement information may be displayed on a screen built into a dashboard of a vehicle. In another embodiment, the advertisement information may be displayed on a screen of a mobile device associated with the user of the vehicle. In one embodiment, both the in-vehicle device and the mobile device may be associated with a location of the user when the user invokes the in-vehicle device to respond to an advertisement.

FIG. 1 shows an exemplary block diagram of a system including an in-vehicle computing device 110, a mobile device 130, and a server 120, according to one embodiment of the present invention. As illustrated, the in-vehicle computing device 110 may communicate with server 120 either directly or indirectly. In one embodiment, the in-vehicle computing device 110 may communicate with the server through an internet cloud or word-wide web. In another embodiment, the in-vehicle computing device may communicate with the server through a cell-tower or a satellite system. In general, the in-vehicle computing device 110 may communicate with the server using any known techniques, without departing from the teachings of the present disclosure.

The in-vehicle computing device 110 may also communicate directly or indirectly with a mobile device 130. The mobile device 130 may be associated with a user of the vehicle. For example, the mobile device may belong to the driver or any of the passengers of the vehicle. The mobile device may be transported by the vehicle. In one embodiment, the in-vehicle device may communicate with the mobile device through peer-to-peer communication, such as Bluetooth or any other wireless communication scheme. In another embodiment, the mobile device may be connected to the vehicle (and hence the in-vehicle computing device) through a wire (e.g., through a built-in USB port). In another embodiment, the mobile device may communicate with the in-vehicle device indirectly, e.g., through internet 140, or the server 120.

In one embodiment, the server 120 is a computing device located in the internet cloud, which may provide a critical advantage of not adding additional computational or data storage burdens on the device built-in the vehicle and/or the mobile device. In one embodiment, the server performs calculations in one or more computing devices "in the cloud," with such computing devices connected to the in-vehicle computing device and/or mobile device via a wireless connection, such as a WiFi®, mobile data network, Bluetooth®, Satellite or similar networks.

In one embodiment, the in-vehicle computing device 110 receives data corresponding to measurements from one or more sensors. The one or more sensors in real-time sense primary information about the environment in the local vicinity, line-of-sight, and/or hearing distance adjacent to the vehicle and/or the user. Primary information may refer to the information that can be directly sensed from the local environment in real-time. The one or more sensors sense primary information, hereinafter also referred to as an "environmental signal," such as location information (e.g., GPS or cellular system location), altimeter elevation, device acceleration, motion, audio, video, biometric information about driver and/or passengers of the vehicle (e.g., heart rate, breathing rate, retina scan, etc.), ambient light, near-field communication, wireless network status, infrared, ultrasonic, gyroscopic, orientation, vehicle status, air-bag status and/or any other parameters.

In general, the mobile device and/or the in-vehicle computing device may include a multitude of such sensors to sense information associated with the user's environment in real-time. Further, a sensor may be associated with the mobile device through another portable or wearable device (e.g., a second device) that is different than but tethered wirelessly or by wire to the mobile device in various combinations. In other words, a sensor need not be on the user's mobile device and/or in-vehicle device but may be associated with the user's device. For example, an audio microphone may be located on an earpiece wirelessly connected to the mobile device. In one embodiment, primary information may be transmitted to the server directly or indirectly. For example, the in-vehicle device may directly transmit sensor data to the server. In another example, the in-vehicle device may be tethered to a mobile device and transmit the sensor data to the server through the mobile device. In yet another example, a wearable device (e.g., a smart watch) may be tethered to the mobile device and/or in-vehicle device. The mobile device and/or the in-vehicle device may relay the data from the wearable device to the server.

Figure 2:
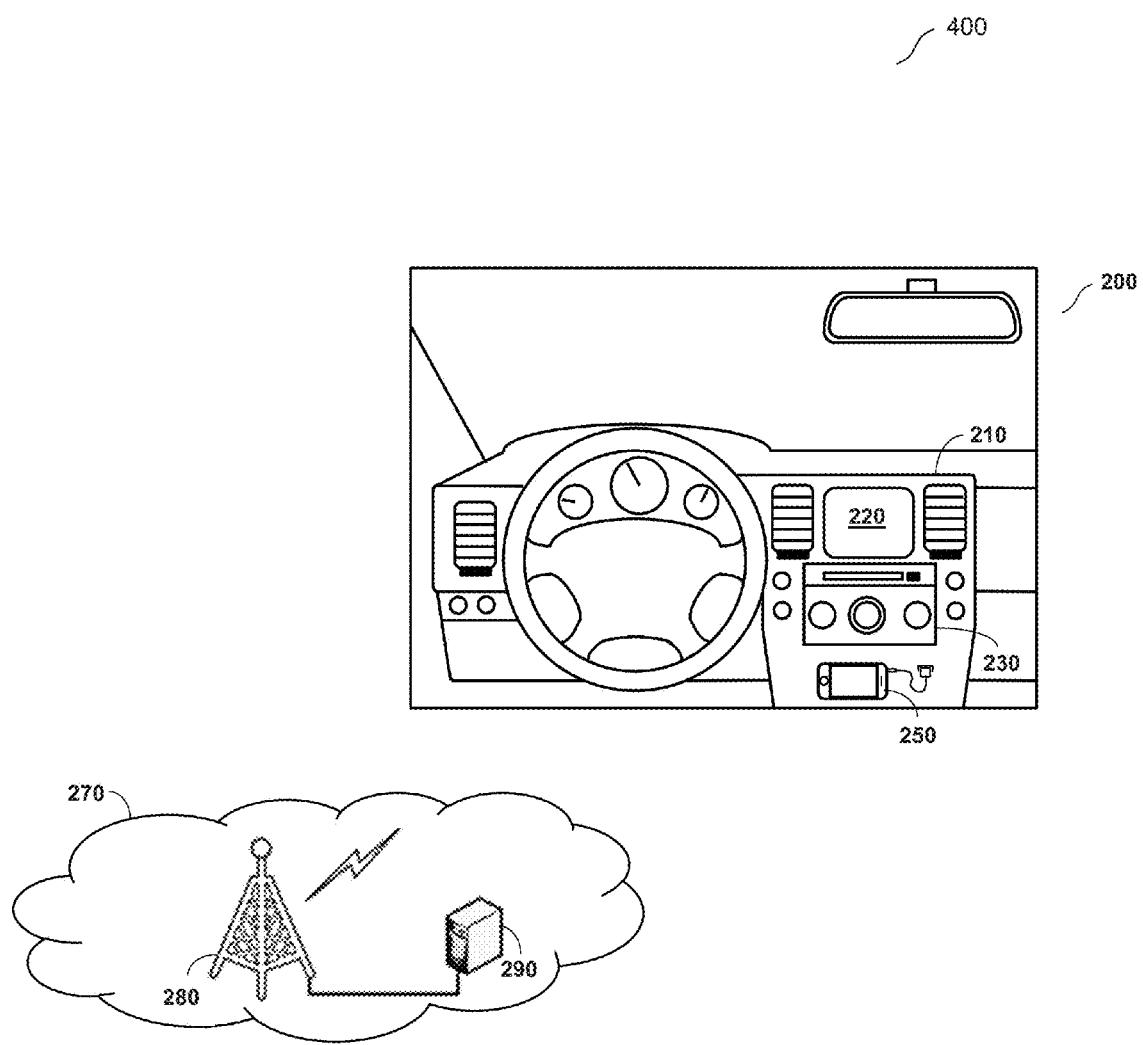
FIG. 2 shows a simplified perspective view of a vehicle interacting with world-wide-web or cloud network, according to one embodiment of the present invention.

FIG. 2 depicts a simplified perspective view of a vehicle interacting with world-wide-web or cloud network 270, according to one embodiment of the present invention. As illustrated, the automotive vehicle 200 may include a dashboard 210, which in turn includes a graphic display screen 220 coupled to a built-in computing device 230 (hereinafter referred to as in-vehicle computing device). The in-vehicle computing device controls information presented to a user of the vehicle on the display screen 220. In one embodiment, in-vehicle computing device 230 may include one or more processors. Each of the processors may be adapted to control navigation and/or entertainment features of the vehicle, such as, for example, Ford Motor Company's SYNC® system, or other automotive manufacturer's proprietary system built into the vehicle. In general, the in-vehicle computing device 230 may include any number of processors and/or input/output devices without departing from the teachings of the present disclosure.

In one embodiment, in-vehicle computing device 230 may include communication circuits and sensors similar to those included in the mobile devices. In another embodiment, in-vehicle computing device 230 may be tethered by wire and/or wirelessly to one or more mobile devices 250 transported on automotive vehicle 200. For example, the geographic location (GPS), heading, direction, speed and other geographic location data associated with the user's location may come from the vehicle's GPS, e.g. from the electronic device disposed in the vehicle, the user's mobile phone GPS, and/or the user's wearable computing device when the wearable computing device has its own internal GPS sensors.

In one embodiment, in-vehicle computing device 230 may directly communicate wirelessly with the world-wide-web or cloud network 270. In this scenario, the in-vehicle computing device does not need an intermediary mobile device to be tethered nearby. In an alternative embodiment, in-vehicle computing device 230 may be tethered to mobile device 250 carried on the vehicle 200, such that wireless communication to internet cloud 270 may be provided by the tethered mobile device 250.

In one embodiment, information associated with the user's mobile device and/or the in-vehicle device may be transmitted to the server. For example, when the airbags in an automotive vehicle go off as a result of a crash, the airbag status sensors may be used to report the airbag deployment, vehicle identification, and/or vehicle location information to the server for the purpose of customizing, finding, and/or delivering advertisement information to the computing device in the vehicle. In another example, tire or engine-status sensor information may be reported to the server.

Figure 3:
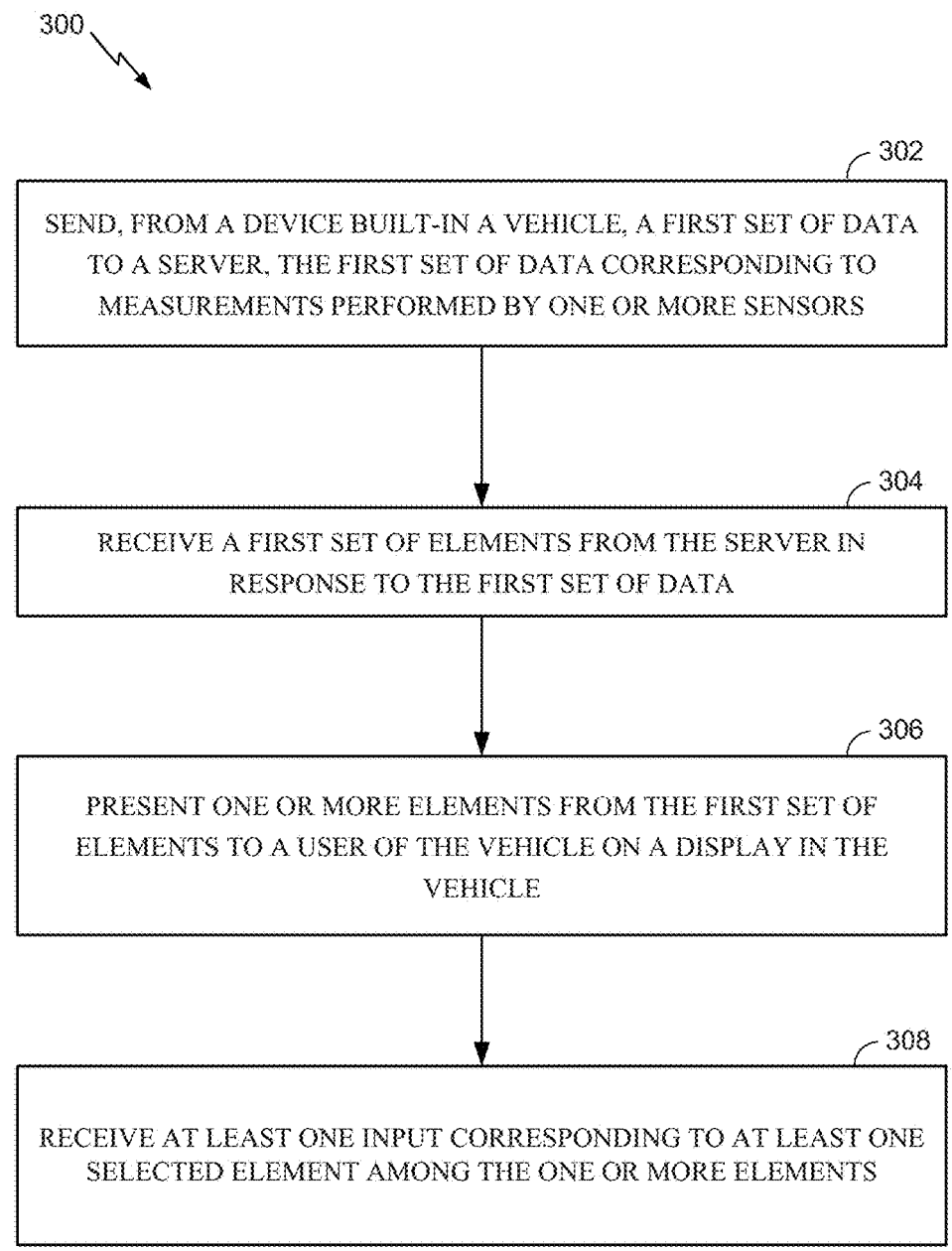
FIG. 3 shows exemplary operations that may be performed by a device, according to one embodiment of the present invention.

FIG. 3 shows exemplary operations that may be performed by an in-vehicle device for providing advertisement information, according to one embodiment of the present invention. At 302, the in-vehicle device sends a first set of data to a server. The first set of data may correspond to measurements performed by one or more sensors (e.g., environmental sensors, such as GPS location information, temperature, direction of movement, etc.). At 304, the in-vehicle device receives a first set of elements from the server in response to the first set of data. In one example, the first set of elements may include advertisement information to be presented to the user of the vehicle. At 304, the in-vehicle device presents one or more elements from the first set of elements to the user on a display in the vehicle. In one embodiment, the display is built-in the vehicle. In another embodiment, the in-vehicle device synchronizes a portion of the in-vehicle device with a display of a second device (e.g., a mobile device being associated with the user, and being transported in the vehicle). The in-vehicle device may send the first set of elements to the second device to be presented to the user.

At 306, the in-vehicle device receives at least one input corresponding to at least one selected element among the one or more elements that were presented to the user. For example, the user may press a button on the steering wheel, on the dashboard, or on the second device to enter his selection. In general, the at least one input may be received from an input device built-in the vehicle, or from an input device associated with the second device. For example, the user may press a button on his mobile phone (or watch) to enter his selection. Any other methods of entering a selection may be used without departing from the teachings of the present disclosure.

In one embodiment, the at least one input corresponds to at least one action to be taken by the device. For example, the user may request additional information corresponding to the selected element, request navigational information to a store corresponding to the advertiser, request to enter into a transaction or a potential transaction associated with the selected element (or advertisement), or any other action corresponding to the selected element.

Figure 4:
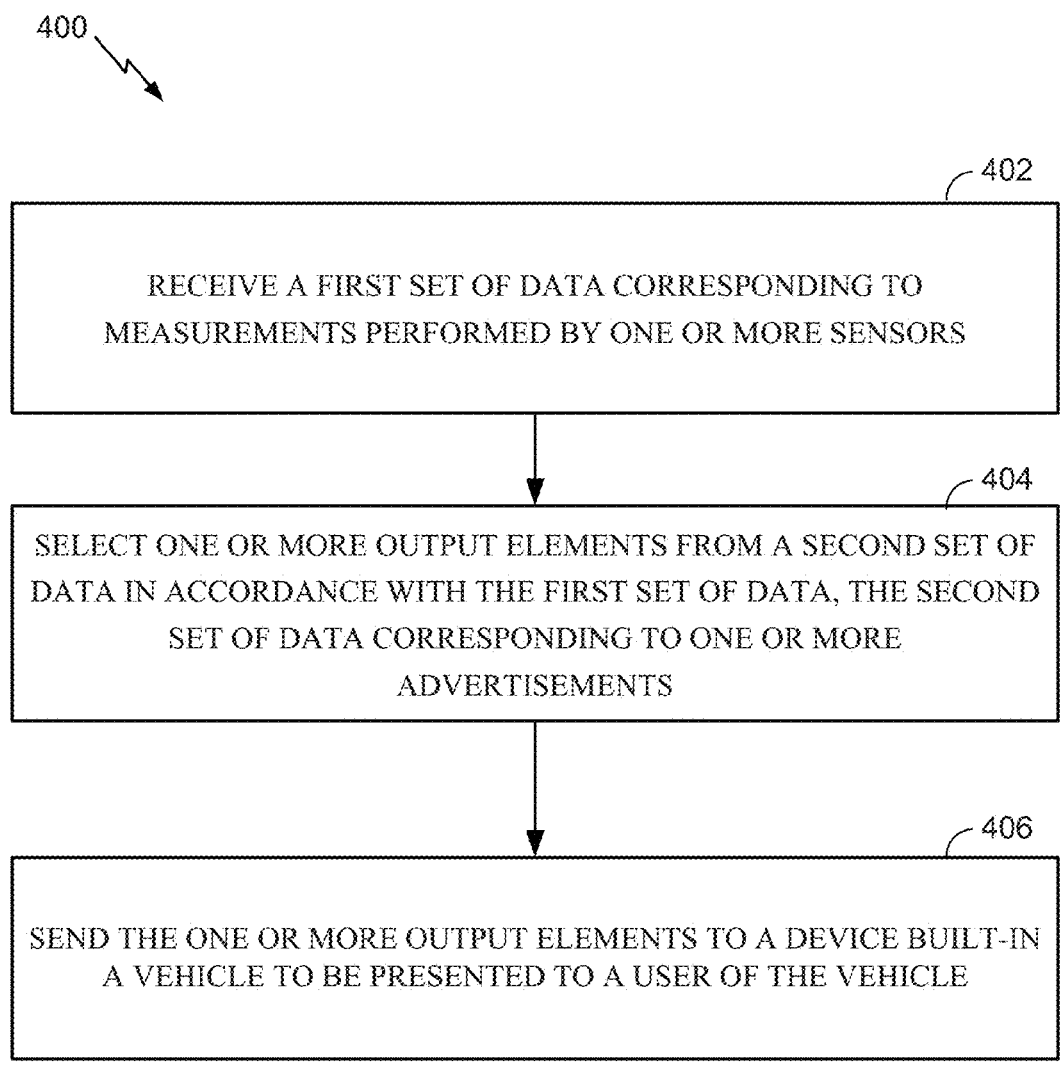
FIG. 4 shows exemplary operations that may be performed by a server, according to one embodiment of the present invention.

FIG. 4 shows exemplary operations that may be performed by a server for selecting advertisement information, according to one embodiment of the present invention. At 402, the server receives a first set of data corresponding to measurements performed by one or more sensors. The server may receive the first set of data from a multitude of sources, such as the in-vehicle device, a mobile device or any other type of devices. At 404, the server selects one or more output elements from a second set of data in accordance with the first set of data. In one embodiment, the second set of data corresponds to one or more advertisement elements. The server may rank the second set of data based on the first set of data and any other data available to the server to identify the advertisement elements that are relevant to the user of the vehicle. At 406, the server sends the one or more output elements to the in-vehicle device to be presented to a user of the vehicle. In one example, the one or more output elements are advertisement information corresponding to one or more advertising entities.

In one embodiment, the server may also receive some information corresponding to interest of the user of the vehicle. In general, the server may receive this information from any sources without departing from the teachings of the present disclosure. In one embodiment, the server receives user interest information from the in-vehicle device. In another embodiment, the server receives the user interest information from a mobile device. In another embodiment, the server may retrieve the user interest information from a database. In one embodiment, the server ranks the second set of data based on their relevance with the first set of data, and/or user interests to generate a ranked set of data. The server may then select one or more of highest ranked elements from the ranked set of data as the one or more output elements to be presented to the user.

Figure 5:
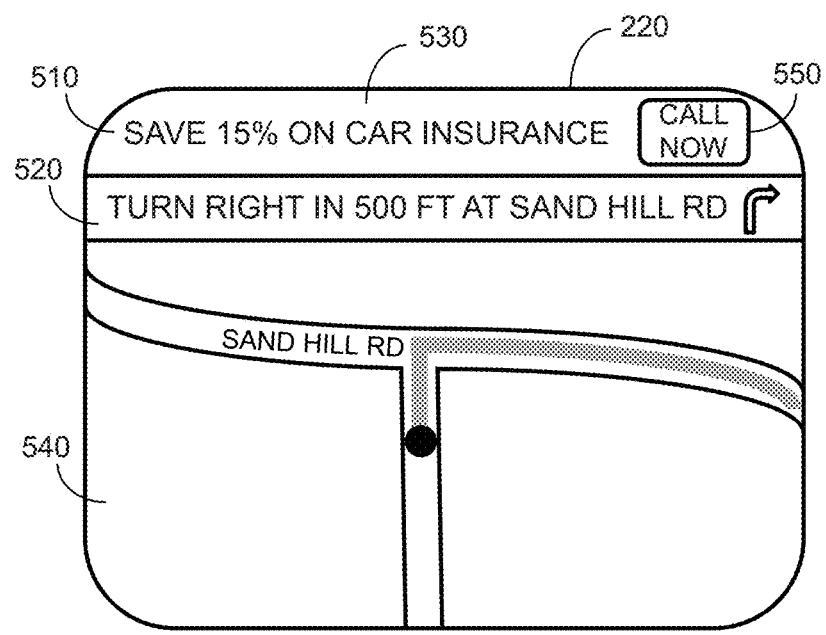
FIG. 5 shows a simplified perspective view of a graphic display screen of a vehicle, according to one embodiment of the present invention.

FIG. 5 illustrates a simplified perspective view of graphic display screen 220 of vehicle 200, in accordance with one embodiment of the present invention. As illustrated, an output element (e.g., an advertisement 510) may be presented to the user along with the navigational information 520. For example, a first portion 530 of the display screen 220 shows the output element 510 while a second portion 540 of the car display 220 shows the navigational information to the user. In one embodiment, graphic display screen 220 may be touch-sensitive or a touchscreen. In addition, first portion 510 of the graphic display screen may include one or more interaction or interactive options, such as input button 550. For example, first portion 510 of the display screen may display a deal to save on car insurance and input button 550 may initiate a phone call to the insurance office.

As illustrated, the input button 550 ("call now") may be used by the user to select the advertisement and/or request extra information about the advertisement. For example, the user may call the advertising company and talk to one of their representatives. In another example, the user may receive additional pre-recorded information about the advertising company by pressing the input button 550. The input button 550 may be used to input any other interaction request by the user. For example, the user may enter into a transaction and/or a potential transaction with the advertising company. The insurance advertisement in this example may have been selected by the server as being relevant after detection of air bag deployment indicating a vehicle accident may have occurred.

Figure 6:
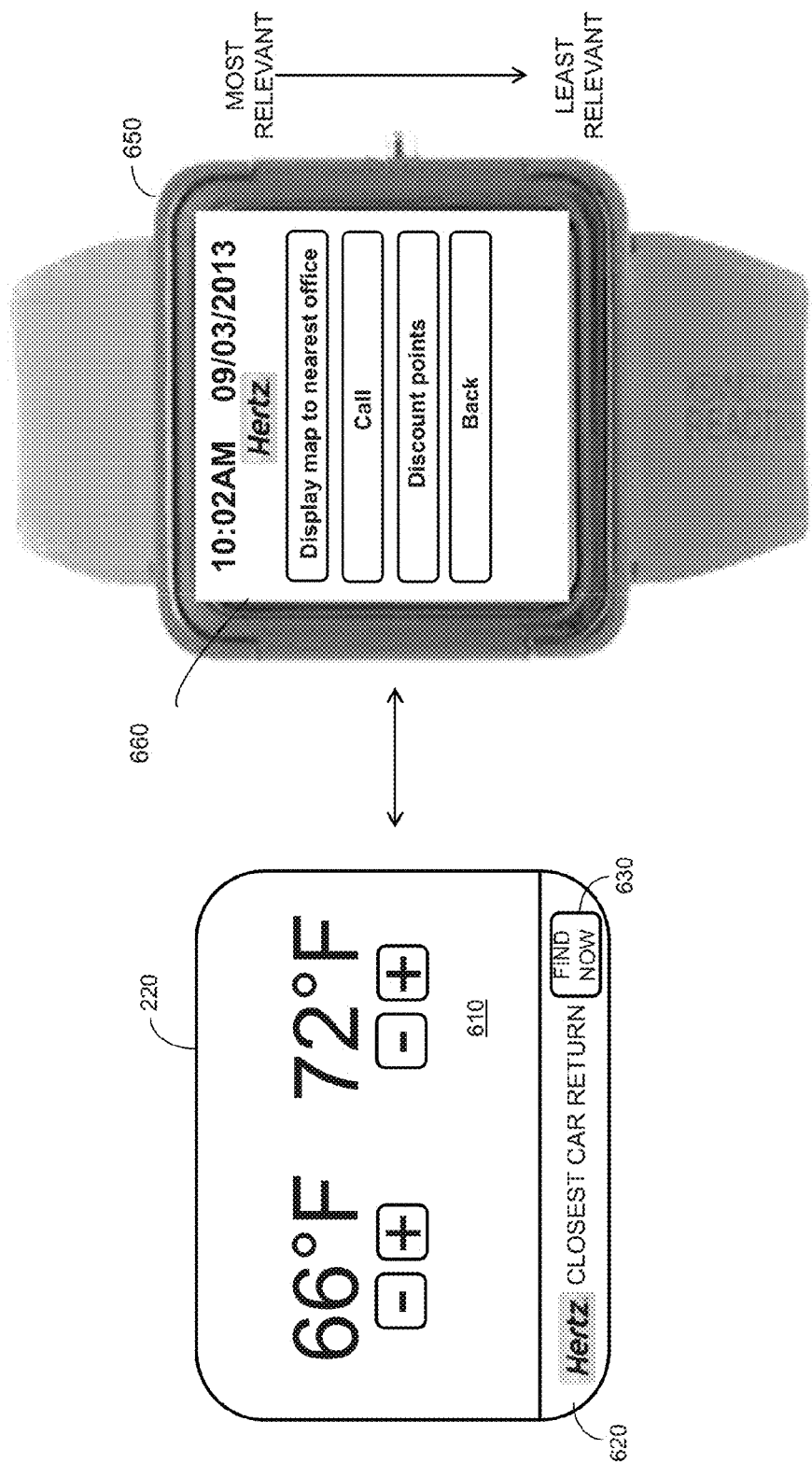
FIG. 6 shows an example scenario in which an in-vehicle device interacts with a mobile device for displaying the information, according to one embodiment of the present invention.

In one embodiment, the output elements may be provided via a software application (e.g., an app) running inside an operating system that runs a display screen in the vehicle. In one embodiment, the software application that presents the output elements to the user is a stand-alone software application that runs on one of the processors built into the vehicle. In another embodiment, the software application may be integrated into other applications that are running on the in-vehicle devices. For example, the software application that presents the output elements may be integrated into a navigational application, a music application, and/or any other type of application running on the in-vehicle device. For example, the output elements are presented via a software application running inside the operating system that runs the display screen in the vehicle, such as the Windows Embedded Automotive® operating system used in the Ford Motor Company's SYNC® system FIG. 6 illustrates an example scenario in which an in-vehicle device interacts with a mobile device for displaying the information, according to one embodiment. In this example, an upper portion 610 of the vehicle display 220 shows information such as a vehicle climate control display supplied by the vehicle. In addition, a lower portion 620 of the display shows the same or derived advertisement information (e.g., advertisement about Hertz car rental company, whether in its original form or modified to fit the format of the graphic display screen and/or input devices).

In this example, lower portion 620 of the graphic display screen displays a rental car logo for the user's rental car company based on a recent rental and an option to find directions to the closest car return location. The information regarding the car rental company is selected according to the analysis done by the server based on location sensor data indicating that the vehicle is nearing an airport. Lower portion 620 of the graphic display screen may further include one or more interactive options, such as input button 630 to find the closest car return location. The user may press the input button 630 to request more information. According to one embodiment, the displayed output elements may be dynamically updated periodically or continuously by the server in real time according to recent sensor information and/or latest user preferences as described below.

In one embodiment, the in-vehicle device may interact with the mobile device 650 of the user of the vehicle to present information to the user. For example, one or more of the output elements may be shown on the in-vehicle display 220, while one or more of the output elements are shown on the display 660 of the mobile device 650. In one embodiment, the in-vehicle display and the display of the mobile device are synchronized and show the same output element(s). In another embodiment, the in-vehicle display shows an output element while the mobile device shows a different output element. In general, the in-vehicle device and the mobile device may show one or more common output elements and/or one or more differing output elements without departing from the teachings of the present disclosure. As illustrated in FIG. 6, display 220 shows an advertisement for the Hertz car return company while display 660 of the mobile device 650 shows more information/options corresponding to the same advertisement company.

In one embodiment, commands from the user may be entered to the system using a multitude of input methods. For example, the user may respond to a local advertisement displayed on graphic display screen 220 built-in the vehicle via a button disposed on the mobile device, and/or a touch sensitive icon displayed on the mobile device and/or the display of the vehicle, via a control button on the steering wheel and/or dashboard 200 of the vehicle, and/or any other methods. For example, the user may enter his selection by a special body gesture, speaking a voice or sound command, touching a device, and/or look or gaze at an object, and the like. The selection from the user may awaken the mobile device and confirm to the user which ad the user wished to respond to, then additional inputs (or key presses/touches/sound command inputs/controls) on the device may select additional response options or alternate ads to select and respond to. In one embodiment, multiple levels of nested interactive option menus may be used by the system to navigate complex option decisions. In one embodiment, a user may gesture, for example, wave their hand over a wearable device, or shake the device, or the user may raise his hand or move another body part, e.g., head, in order to trigger the response/reaction to the interactive option.

In one example, the mobile device may be synchronized with the in-vehicle device through wired or wireless communications. In general, two or more separate displays (e.g., built into the vehicle and/or mobile device) may exist in the system. In addition, two or more separate control systems may exist (e.g., on the dashboard and/or steering wheel of the vehicle, or on the mobile device, etc.) to display the output elements and/or respond to the interaction options displayed. In general, the user may respond to the presented information using one or more of the devices. For example, the user may press a button on the dashboard to respond to the advertisement. Alternatively, the user may press a button on his mobile phone to respond to the advertisement. In another embodiment, the user may use either or both buttons on the dashboard and/or or on the mobile device or both to respond to an advertisement.

In one embodiment, the server, in real-time, may correlate, filter, select and/or rank information from a multitude of sources to generate the output elements. For example, the server may receive some information corresponding to a user's interests other information from the user or the vehicle's current environment. This information may include real-time data and/or non-real-time data. Real-time data may refer to an input, such as sensor readings corresponding to an event at the actual time that the event happens. In addition, processing an input in "real-time" refers to a substantially small amount of delay between receiving an input by a device, and processing the input and generating a corresponding output. The non-real-time data may refer to the information that is stored in one or more databases.

In one embodiment, the user's interests are declared interests, such as through active or passive feedback from the user may be used by the server in ranking the available information. In another embodiment, the user's interests may be predicted or anticipated automatically.

In general, any number of sensors may provide data to the server. For example, the location information (e.g., GPS), heading, direction, speed of the vehicle and other information corresponding to the user or the vehicle may be received from the vehicle's built-in GPS system, the GPS system in the user's mobile phone and/or any other devices, such as the user's wearable device that has its own internal GPS sensors.

The sensor information may be sent to the server via cable, wireless radio, infrared, internet network link, or any other method. In one embodiment, data from one or more real-time sensors is passively collected, e.g., an audio or video sensor data may be continuously transmitted in real-time, for a predetermined period of time. The user may choose the predetermined period of time via controls in the mobile device. In one embodiment, primary sensor information is transmitted upon request or demand, or upon a timed predetermined sequence.

In one embodiment, information relating to frequency-of-response may be collected from each individual user and/or groups of users. In one embodiment, a sorted display of "popular" responses could be shown given the input (response rates) from either a specific user, users that are grouped from a specific geographical area, and/or user's grouped according to a user's social graph. For example, drivers in a certain geographic area may be responding to specific types of advertisements. Therefore, these popular advertisements may be presented to the user when his vehicle nears/enters that specific geographic area. In another embodiment, if users in a specific social group are responding to specific types of advertisements, the user may be presented with advertisements that are popular in his social group and/or friends.

In one embodiment, the primary information may include information associated with the mobile device, such as contacts, prior, e.g., historical location data of the device, email addresses, account, serial, identification, model, firmware, web address, stored photo or video, historical browser information such as prior purchases and/or payments, and/or the like. The information associated with the mobile device may be transmitted from the mobile device to the server.

In this document, the terms "secondary information" or "supplemental information" are used to refer to information that is not primary information. In one embodiment, secondary information may be associated with a user interest from the user's social network in the cloud, such as likes, dislikes, social graphs, social graph elements, friends, thumbs up, thumbs down, email addresses, stored photo or video, product or service reviews, #hashtags, tweets and/or the like. The information associated with the user's social network, such as Facebook, may be store on the device or be received from the cloud.

In one embodiment, the user is associated with the mobile device (e.g., the owner of a mobile device). In another embodiment, the user may not be associated with the mobile device. For example, the user may be a social network friend of or someone who recommends the user who is associated with the mobile device. In this case, the data may include recommendations, preferences, or interests of a user who is not associated with the mobile device but is still associated through the social network with the user who is associated with the mobile device. Thereby, the server may have access to a multitude of user interest data from users who may share similar interests as the user associated with the mobile device. In one embodiment, other sensors in the user's nearby location, such as sensors associated with other nearby users, fixed sensors, and/or the like may be used as primary real-time inputs. In one embodiment, data in a user's social graph, for example such as the Facebook social graph, or other similar user data, such as the user's friends or friend's likes, are used to correlate and weight data inputs. In one embodiment, the information associated with advertisers may be stored in one or more databases on the server.

In one embodiment, the ranked order is associated with the user's interests and/or location in addition to the advertiser's location. As location of the vehicle and/or mobile device changes, the output elements presented to the user may be updated. In one embodiment, the output elements may be streamed continuously, periodically, at predetermined times, or at user or advertiser request.

In one embodiment, a multitude of advertisements that are relevant/related in real-time to the primary and/or secondary data inputs and thus selected to match the user's real-time interests may be presented to the user. In one embodiment, at least one advertisement, which is deemed to relate in real-time to at least one of the data input sources, may be presented to the user in the output data stream (e.g., ranked information). In one embodiment, at least one merchant offer, for example such as a local daily deal, which may be deemed to relate to at least one of the data input sources, may be included in the output data stream.

In one embodiment, the output elements may include an actionable link and/or one or more interaction options associated with at least one relevant advertisement. For example, the actionable link may direct the user's browser on his mobile device to a website that may initiate a purchase of a service or product. In another embodiment, the user may request navigation information for the nearest store associate with an advertisement.

In one embodiment, a portion of the output elements may be continuously updated in real-time. In another embodiment, a portion of the output elements may be updated at a predetermined time when the server determines the output elements should be updated due to a change in one of the multitude of information inputs. In one embodiment, the output elements may be updated periodically. In one embodiment, the ranking of the output elements may be updated dynamically at predetermined times when the server determines a new ranking order is appropriate due to changes in one of the multitude of information inputs.

In one embodiment, server (120 as illustrated in FIG. 1) categorizes the incoming real-time events data and/or advertiser information using a data categorizing method, such as Bayesian classifier. The Bayesian classifier uses probabilistic statistical techniques to minimize the probability of misclassification by using training data to learn over time how to classify the incoming real-time events data and advertiser information correctly. In one embodiment, the categorization of the multitude of incoming real-time events data and advertiser information is used to create a multitude of information display types, such as sports scores, local information such as movie times, local merchant sales information, and the like. In one embodiment, the multitude of information display types may be presented to the user in either different locations within a display, or are rotated/presented to the user over time, e.g., audio streamed in user interest ranking order.

Server 120 also receives sensor data, e.g., audio, video, location, time, and device information. In one embodiment, the sensor's data may be assigned a numerical weighting with the purpose of giving that sensor's data a relative importance. The numerical weight assigned to any given data input is referred to as the RankWeight for that sensor type. This ranking is not the only algorithm that determines rankings in the output results, but merely one of many factors used to determine ranking of input data at any given time. The RankWeight may be static or dynamic, and may be different for different types of sensors, users, or corresponding to other factors. In one embodiment, more recent primary sensor data, such as voice-recognized words may be given a higher weight (e.g., more relevant) than older data.

The received sensor data and the classified real-time events data and advertiser information are used to select relevant advertisement or data. In one embodiment, the information may be ranked by a weighted sum approach, Eigen-vector approach, or any other approach and/or algorithm. In one embodiment, collaborative filtering may be used to automatically estimate the relevance for the data. For example, data may be assigned a predicted weight factor (e.g., by filtering) based on matching a multitude of recommendations, e.g., collaboration, from social media friends for data that the user of the mobile device has not directly rated. Collaborative filtering leverages the extensive data input from social media and the other extensive secondary data sources that are input to the server with high statistical confidence.

Several exemplary formulas are presented below to demonstrate how to calculate weighted averages which serves as an element in calculating a relevance of data. The weighted mean is similar to an arithmetic mean, e.g., the most common type of average, where instead of each of the data points contributing equally to the final average, some data points contribute more than other data points. The notion of weighted mean plays a role in descriptive statistics and also occurs in a more general form in several other areas of mathematics. Formally, a weighted mean of a non-empty set of data $\{x_1, x_2, \ldots, x_n\}$, with non-negative weights $\{w_1, w_2, \ldots, w_n\}$, can be written as follows:

$$\bar{x} = \frac{\sum_{i=1}^{n} w_i x_i}{\sum_{j=1}^{n} w_j},$$

or $$\bar{x} = \frac{w_1 x_1 + w_2 x_2 + \cdots + w_n x_n}{w_1 + w_2 + \cdots + w_n}.$$

Therefore, data elements with a high weight contribute more to the weighted mean than do elements with a low weight. The weights cannot be negative. Some may be zero, but not all of them (since division by zero is not allowed).

The formulas are simplified when the weights are normalized such that they sum up to one (e.g., $\Sigma_{1,i.e.i=1}^{n} w_i = 1$). For such normalized weights, the weighted mean can be written as follows:

$$\bar{x} = \sum_{i=1}^{n} w_i x_i$$

Note that one may normalize the weights by making a transformation on the weights such that $$w'_i = \frac{w_i}{\sum_{j=1}^{n} w_j}.$$

Using the normalized weights yields the same results as when using the original weights. Indeed, $$\bar{x} = \sum_{i=1}^{n} w'_i x_i$$

$$= \sum_{i=1}^{n} \frac{w_i}{\sum_{j=1}^{n} w_j} x_i$$

$$= \frac{\sum_{i=1}^{n} w_i x_i}{\sum_{j=1}^{n} w_j}$$

$$= \frac{\sum_{i=1}^{n} w_i x_i}{\sum_{i=1}^{n} w_i}.$$

The common mean $$\frac{1}{n}\sum_{i=1}^{n}x_i$$

is a special case of the weighted mean where all data have equal weights, $w_i=w$. When the weights are normalized, then $$w'_i = \frac{1}{n}.$$

To take into account variance, the weighted mean of a list of data for which each element xi comes from a different probability distribution with known variance $\sigma_i^2$, one possible choice for the weights may be written as follows:

$$w_i = \frac{1}{\sigma_i^2}.$$

The weighted mean may then be written as follows:

$$\bar{x} = \frac{\sum_{i=1}^{n}(x_i w_i)}{\sum_{i=1}^{n} w_i},$$

and the variance of the weighted mean may be written as follows:

$$\sigma_{\bar{x}}^2 = \frac{1}{\sum_{i=1}^{n} w_i},$$

which reduces to $$\sigma_{\bar{x}}^2 = \frac{\sigma_0^2}{n},$$

when all $\sigma_i = \sigma_0$.

The significance of this choice is that this weighted mean is the maximum likelihood estimator of the mean of the probability distributions under the assumption that they are independent and normally distributed with the same mean.

Vector-Valued Estimates:

As in the scalar case, the weighted mean of multiple estimates can provide a maximum likelihood estimate. For vector-valued estimates, σ2 may be replaced by the covariance matrix, as follows:

$$W_i = \Sigma_i^{-1}.$$

The weighted mean may be written as follows:

$$\bar{x} = \left(\sum_{i=1}^{n}\sum_{i}^{-1}\right)^{-1}\left(\sum_{i=1}^{n}\sum_{i}^{-1}x_i\right),$$

and the covariance of the weighted mean may be written as follows:

$$\sum_{\bar{x}} = \left(\sum_{i=1}^{n}\sum_{i}^{-1}\right)^{-1},$$

For example, consider the weighted mean of the point [1 0] with high variance in the second component and [0 1] with high variance in the first component. Then $$x_1 = [10]^T, \sum_1 = \begin{bmatrix} 1 & 0 \\ 0 & 100 \end{bmatrix}$$

$$x_2 = [01]^T, \sum_2 = \begin{bmatrix} 100 & 0 \\ 0 & 1 \end{bmatrix},$$

Then, the weighted mean may be written as follows:

$$\bar{x} = \left(\sum_1^{-1} + \sum_2^{-1}\right)^{-1}\left(\sum_1^{-1} x_1 + \sum_2^{-1} x_2\right)$$

$$= \begin{bmatrix} 0.9901 & 0 \\ 0 & 0.9901 \end{bmatrix}\begin{bmatrix} 1 \\ 1 \end{bmatrix}$$

$$= \begin{bmatrix} 0.9901 \\ 0.9901 \end{bmatrix},$$

in this case, the [1 0] estimate is "compliant" in the second component and the [0 1] estimate is compliant in the first component, so the weighted mean is nearly [1 1].

Another method of calculation takes into account correlations between data elements. In the general case, suppose that $X=[x_1, \ldots, x_n]$, C is the covariance matrix relating the quantities xi, $\bar{x}$ is the common mean to be estimated, and W is the design matrix $[1, \ldots, 1]$ (of length n). The Gauss-Markov theorem states that the estimate of the mean having minimum variance is written as follows:

$$\sigma_{\bar{x}}^2 = (W^T C^{-1} W)^{-1}, \text{ and}$$

$$\bar{x} = \sigma_{\bar{x}}^2 (W^T C^{-1} X).$$

Consider the time series of an independent variable x and a dependent variable y, with n observations sampled at discrete times ti. In many common situations, the value of y at time ti depends not only on xi but also on its past values. Commonly, the strength of this dependence decreases as the separation of observations in time increases. To model this situation, one may replace the independent variable by its sliding mean z for a window size m, as follows:

$$z_k \sum_{i=1}^{m} w_i x_{k+1-i},$$

In the scenario described in the previous section, most frequently the decrease in interaction strength obeys a negative exponential law. If the observations are sampled at equidistant times, then exponential decrease is equivalent to decrease by a constant fraction 0<Δ<1 at each time step. Setting w=1−Δ, m normalized weights can be defined as follows:

$$w_i = \frac{w^{j-1}}{V_1},$$

where V1 is the sum of the un-normalized weights. In this case V1 can be written as follows:

$$V_1 = \sum_{i=1}^{m} w^{j-1} = \frac{1-w^m}{1-w},$$

In this case, V1 approaches V1=1/(1−w) for large values of m.

The damping constant w corresponds to the actual decrease of interaction strength. If this cannot be determined from theoretical considerations, then the following properties of exponentially decreasing weights are useful in making a suitable choice: at step (1−w)−1, the weight approximately equals to e−1(1−w)=0.39(1−w), the tail area approximately equals to e−1, the head area approximately equals to 1−e−1=0.61. The tail area at step n is ≤e−n(1−w), where primarily the closest n observations matter and the effect of the remaining observations can be ignored safely. Then the damping constant w may be chosen such that the tail area is sufficiently small. It should be noted that the weight calculation methods described above are mere examples, and any other weight calculating and/or ranking method may be used without departing from the teachings of the present disclosure.

In one embodiment, the user may provide active feedback via the mobile device. Active feedback may include explicit user feedback, e.g., thumbs-up or thumbs-down, and/or selecting an option among presented interactive options. Active feedback may further include implicit user feedback based for example on the user purchasing an advertised product or service. An example of implicit user feedback may be when a user buys the product or service or visits a vendor or service venue. User feedback may be stored in a user interest database. User interest data may further include historical information, which may be heavily weighted to prefer recent data. Historical information may include prior purchases, location destinations, and the like. In one embodiment, a user's feedback or selections are used to modify/change the weightings of that user's later displayed resulting information. In one embodiment, relevance outputs can be weighted by a user's stated, e.g., explicit user feedback, or detected, e.g., implicit user feedback interests. For example, twitter #hashtags, Facebook Likes, recent social media or email data, a user's friend's Facebook postings, and the like.

In one embodiment, when the primary sensor information is continuously transmitted, the server may continuously and/or passively monitor (e.g., "listen"), decode using voice recognition, and correlate words or phrases in conversation within hearing distance of the mobile device, to provide real-time user interest information associated with those "heard" words. For example, if the microphone input of the mobile device hears the word "hungry," the server may automatically display a distance to a restaurant that serves food that is of interest to the user. In another embodiment, when the primary sensor information is continuously transmitted, the server may continuously and/or passively monitor, decode and correlate captured video or periodically sampled static visual images in the line-of-sight of the mobile device, to provide real time user interest information. In one embodiment, the decoded video or camera image data may include decoded text key words or symbols associated with advertising.

In one embodiment, data such as #hashtags associated with a user's interests, or in another example a list of "likes" associated with a user's interests, are used to correlate and weight data inputs. For example, if a user's wearable-computing-device recognizes (e.g., passively or actively) the words "Italian," then one such resulting output streams may be Italian restaurants in the local area.

In one embodiment, the weighting of the data may be influenced by other relevant people's prior selections. Other relevant people may include people other than the user who may be nearby, friends, or anyone else. Such ranking may be further ranked according to the other relevant person's "distance," e.g., geographic distance, social graph distance, and/or the like, from the user. In one embodiment, tweets, Facebook posts, and other social media or blog or related posts (entries) are used as inputs into the server.

In one embodiment, the resulting information (e.g., output elements) may not necessarily be displayed or immediately displayed on the same device. A first portion of the multitude of resulting information may be displayed on a mobile device, while a second portion different than the first portion may be displayed on another mobile device.

In one embodiment, pictures and any resulting text or extracted data, e.g., facial recognition/identification of people captured by the sensors on the user's mobile device may be used as primary inputs into the real-time relevance engine. In one embodiment, data from the sensors on the user's mobile device are combined and/or correlated with sensor input data from other nearby sensors to increase the confidence of the rank weighting of that sensor's data. Other nearby sensors may include sensors corresponding to other users, or any other fixed sensor that are in close proximity to the user. This combined/correlated sensor data may both increase the confidence of the sensor input when two different nearby sensors are sensing the same inputs, or could decrease the confidence when two nearby sensors are detecting different information.

In one embodiment, an intention detection output from the server may be calculated based on a weighted input of factors including; a) real time location sensor data, e.g., what shopping district the mobile device and user are in, b) place of business, e.g., what specific store the mobile device is in, and c) detected items, e.g., what product packaging the mobile device is seeing in real time. In one embodiment, real-time analytics are output from the server. Such analytics and/or "intention detection" outputs may be used to improve relevant advertisement selection.

Figure 7:
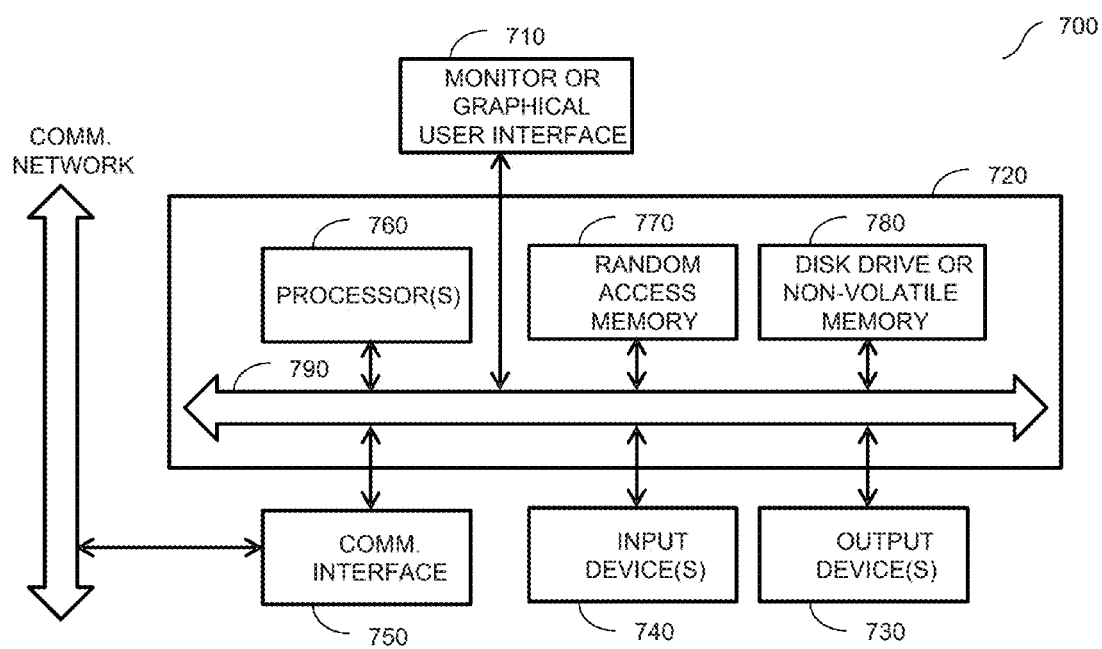
FIG. 7 shows a simplified block diagram of a computer system that may incorporate embodiments of the present invention.

FIG. 7 shows a simplified block diagram of a computer system 700 that may incorporate embodiments of the present invention. FIG. 7 is merely illustrative of an embodiment incorporating the present invention and does not limit the scope of the invention as recited in the claims. One of ordinary skill in the art would recognize other variations, modifications, and alternatives. In one embodiment, the computer system 700 is the in-vehicle device. In another embodiment, the computer system 700 is the mobile device.

In one embodiment, computer system 700 typically includes a monitor or display 710, a computer 720, user output devices 730, user input devices 740, communications interface 750, and the like. Computer system 700 may also be a smart phone, tablet-computing device, and the like, such that the boundary of computer 720 may enclose monitor or graphical user interface 710, user output devices 730, user input devices 740, and/or communications interface 750 (not shown).

As shown in FIG. 7, computer 720 may include a processor(s) 760 that communicates with a number of peripheral devices via a bus subsystem 790. These peripheral devices may include user output devices 730, user input devices 740, communications interface 750, and a storage subsystem, such as random access memory (RAM) 770 and disk drive or non-volatile memory 780.

User input devices 730 include all possible types of devices and mechanisms for inputting information to computer system 720. These may include a keyboard, a keypad, a touch screen incorporated into the display, audio input devices such as voice recognition systems, microphones, and other types of input devices. In various embodiments, user input devices 730 are typically embodied as a computer mouse, a trackball, a track pad, a joystick, wireless remote, drawing tablet, voice command system, eye tracking system, and the like. User input devices 730 typically allow a user to select objects, icons, text and the like that appear on the monitor or graphical user interface 710 via a command such as a click of a button, touch of the display screen, or the like.

User output devices 740 include all possible types of devices and mechanisms for outputting information from computer 720. These may include a display (e.g., monitor or graphical user interface 710), non-visual displays such as audio output devices, etc.

Communications interface 750 provides an interface to other communication networks and devices. Communications interface 750 may serve as an interface for receiving data from and transmitting data to other systems. Embodiments of communications interface 750 typically include an Ethernet card, a modem (telephone, satellite, cable, ISDN), (asynchronous) digital subscriber line (DSL) unit, FireWire interface, USB interface, and the like. For example, communications interface 750 may be coupled to a computer network, to a FireWire bus, or the like. In other embodiments, communications interfaces 750 may be physically integrated on the motherboard of computer 720, and may be a software program, such as soft DSL, or the like. Embodiments of communications interface 750 may also include a wireless radio transceiver using radio transmission protocols such as Bluetooth®, WiFi®, cellular, and the like.

In various embodiments, computer system 700 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 720 includes one or more Xeon microprocessors from Intel as processor(s) 760. Further, one embodiment, computer 720 includes a UNIX-based operating system. In another embodiment, the processor may be included in an applications processor or part of a system on a chip.

RAM 770 and disk drive or non-volatile memory 780 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like. RAM 770 and disk drive or non-volatile memory 780 may be configured to store the basic programming and data constructs that provide the functionality of the present invention.

Software code modules and instructions that provide the functionality of the present invention may be stored in RAM 770 and disk drive or non-volatile memory 780. These software modules may be executed by processor(s) 760. RAM 770 and disk drive or non-volatile memory 780 may also provide a repository for storing data used in accordance with the present invention.

RAM 770 and disk drive or non-volatile memory 780 may include a number of memories including a main random access memory (RAM) for storage of instructions and data during program execution and a read only memory (ROM) in which fixed instructions are stored. RAM 770 and disk drive or non-volatile memory 780 may include a file storage subsystem providing persistent (non-volatile) storage for program and data files. RAM 770 and disk drive or non-volatile memory 780 may also include removable storage systems, such as removable flash memory.

Bus subsystem 790 provides a mechanism for letting the various components and subsystems of computer 720 communicate with each other as intended. Although bus subsystem 790 is shown schematically as a single bus, alternative embodiments of the bus subsystem may utilize multiple busses.

FIG. 7 is representative of a computer system capable of embodying a portion of the present invention. It will be readily apparent to one of ordinary skill in the art that many other hardware and software configurations are suitable for use with the present invention. For example, the computer may be a desktop, laptop, portable, rack-mounted, smart phone or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; embedded processors such as ARM® licensed from ARM® Holdings plc., and the like. Further, other types of operating systems are contemplated, such as Windows®, WindowsXP®, WindowsNT®, WindowsRT®, Windows Embedded Automotive® or the like from Microsoft Corporation, Solaris from Sun Microsystems, LINUX, UNIX, or mobile operating systems such as Android® from Google Inc., iOS® from Apple Inc., Symbion® from Nokia Corp., and the like. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The above embodiments of the present invention are illustrative and not limiting. The above embodiments of the present invention may be combined, in one or multiple combinations, as various alternatives and equivalents are possible. Although, the invention has been described with reference to a wearable-computing device such as a smartwatch by way of an example, it is understood that the invention is not limited by the type of wearable device. Although, the invention has been described with reference to certain radio communications interface by way of an example, it is understood that the invention is not limited by the type of radio, wireless, or wired communications interface. Although, the invention has been described with reference to certain operating systems by way of an example, it is understood that the invention is not limited by the type of operating systems. Other additions, subtractions, or modifications are obvious in view of the present disclosure and are intended to fall within the scope of the appended claims.

What is claimed is:

1. A method for providing information to a user of a vehicle, comprising:
    receiving, by a device built into the vehicle, sensor data corresponding to measurements performed by one or more sensors of a mobile device, wherein the mobile device is wirelessly tethered to the device built into the vehicle via a local proximity network;
    sending, by the device built into the vehicle, primary information associated with the sensor data to a server through a network;
    receiving, by the device built into the vehicle, a first set of elements from the server in response to sending the primary information associated with the sensor data, the first set of elements configured for display on a display in the vehicle;
    synchronizing, by the device built into the vehicle, a portion of the first set of elements with a second display of the mobile device via the local proximity network;
    presenting, by the device built into the vehicle, one or more elements from the first set of elements on the display in the vehicle;
    sending, by the device built into the vehicle, a portion of the first set of elements to the mobile device according to the synchronizing; and
    receiving input, via the display in the vehicle or the second display of the mobile device, of a selection from among the one or more elements.

2. The method of claim 1,
    wherein the one or more data elements presented on the display in the vehicle each in an actionable link configured to direct a browser to a website.

3. The method of claim 1, wherein the selection from among the one or more elements causes a browser to take at least one action.

4. The method of claim 3, wherein the at least one action comprises requesting additional information corresponding to the selected element.

5. The method of claim 3, wherein the at least one action comprises
    requesting navigational information to a venue corresponding to an advertiser.

6. The method of claim 3, wherein the at least one action comprises a request to enter into a transaction or a potential transaction associated with the selected element.

7. The method of claim 1, wherein the presenting one or more elements from the first set of elements comprises:
    sending the one or more elements to a second device associated with the user to be presented on a screen of the mobile device.

8. The method of claim 1, wherein the selection is received from an input device built into the vehicle.

9. The method of claim 1, wherein the selection is received from the mobile device.

10. The method of claim 1, wherein the display is built into the vehicle.

11. The method of claim 1, further comprising:
    synchronizing the display built into the vehicle with a second display of the mobile device.

12. The method of claim 1, wherein the presenting one or more elements from the first set of elements further comprises presenting an audio corresponding to the one or more elements.

13. The method of claim 1, wherein the at least one of the one or more sensors is disposed in the vehicle.

14. The method of claim 1, wherein the at least one of the one or more sensors is disposed in the mobile device.

15. An apparatus built into a vehicle for providing information to a user, the apparatus comprising:
    a communications interface including a transmitter and receiver;
    a non-transitory processor-readable storage medium comprising executable computer code; and
    a processor,
    wherein the executable computer code, with the processor, cause the apparatus to:
    receive sensor data corresponding to measurements performed by one or more sensors of a mobile device, wherein the mobile device is wirelessly tethered to the device built into the vehicle via a local proximity network;
    transmit primary information associated with the sensor data to a server through a network;
    receive a first set of elements from the server in response to sending the primary information associated with the sensor data, the first set of elements configured for display on a display in the vehicle;
    synchronize a portion of the first set of elements with a second display of the mobile device via the local proximity network;
    present one or more elements from the first set of elements on the display in the vehicle;
    send a portion of the first set of elements to the mobile device according to the synchronizing; and
    receive input, via the display in the vehicle or the second display of the mobile device, of a selection from among the one or more elements.

16. A non-transitory processor-readable medium for providing information to a user of a vehicle, comprising processor-readable instructions configured to cause a processor to:
    receive, by a device built into the vehicle, sensor data corresponding to measurements performed by one or more sensors of a mobile device, wherein the mobile device is wirelessly tethered to the device built into the vehicle via a local proximity network;
    send, by the device built into the vehicle, primary information associated with the sensor data to a server through a network;
    receive, by the device built into the vehicle, a first set of elements from the server in response to sending the primary information associated with the sensor data, the first set of elements configured for display on a display in the vehicle;
    synchronizing, by the device built into the vehicle, a portion of the first set of elements with a second display of the mobile device via the local proximity network;
    present, by the device built into the vehicle, one or more elements from the first set of elements on the display in the vehicle;

sending, by the device built into the vehicle, a portion of the first set of elements to the mobile device according to the synchronizing; and receive input, via the display in the vehicle or the second display of the mobile device, of a selection from among the one or more elements.

* * * * *